Patented Sept. 5, 1933

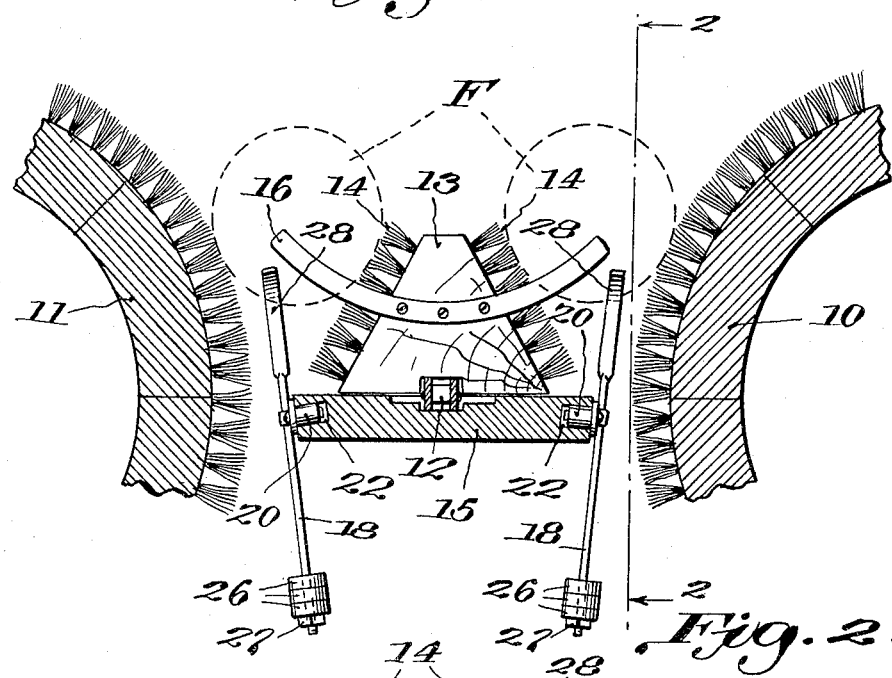
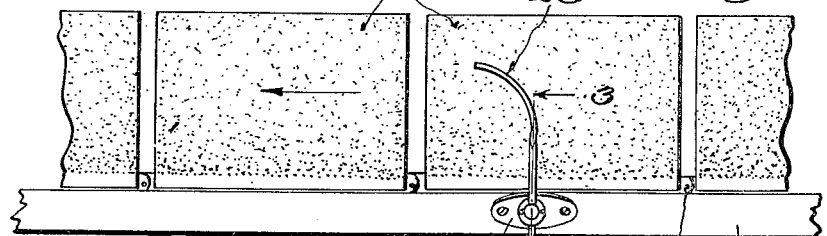
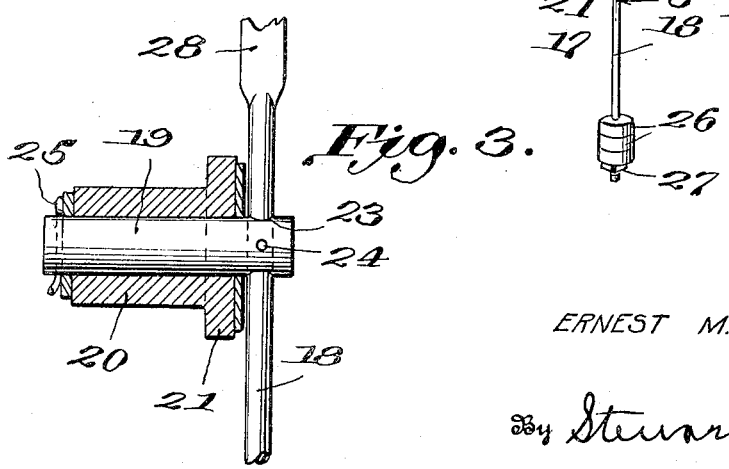

1,925,992

UNITED STATES PATENT OFFICE 1,925,992

APPARATUS FOR TREATING FRUIT

Ernest M. Brogden, Pomona, Calif., assignor to Brogdex Company, Winter Haven, Fla., a corporation of Florida Application February 1, 1930. Serial No. 425,230

3 Claims. (Cl. 146—202)

This invention relates generally to apparatus for treating fruit; and it relates more particularly to apparatus for rubbing or brushing fresh fruit preparatory to marketing the same.

The invention is especially useful in treating fresh fruit such as oranges, lemons, grapefruit, apples and the like, but other fruits and also vegetables may be treated as well and therefore the term fruit as used herein is to be understood as including not only fruit proper but also vegetables and the like.

Broadly speaking, the novel apparatus embodying this invention comprises means for brushing or rubbing the surface of the fruit, and means associated therewith for causing irregular movements of the fruit upon varying axes as it goes through the apparatus to ensure uniformity and thoroughness of the brushing effect.

An object of the invention is to provide an inexpensive device of the character described which may be associated with standard rubbing or brushing apparatus without requiring any or much change in said apparatus and which is simple and sturdy in construction.

Other objects and novel features and advantages of the invention will become apparent from the following description taken in conjunction with the accompanying drawing which illustrates one practical form of apparatus embodying the invention, it being understood that the description of this specific embodiment is merely illustrative and not restrictive.

In the drawing:

Fig. 1 is a fragmentary end view, in section, of rubbing or brushing apparatus embodying the invention, Fig. 2 is a fragmentary view in side elevation taken on the line 2—2 of Fig. 1, and Fig. 3 is a fragmentary enlarged detail view, in section, taken on the line 3—3 of Fig. 2.

The invention is adapted for use with any rubbing or brushing apparatus, of which there are several types in common use today, in which one of the rubbing or brushing elements is a revolving brush along which the fruit is fed in its travel through the apparatus, but, for convenience, it has been illustrated and described herein as associated with a rubbing or brushing unit of the type illustrated in Brogden Patent No. 1,671,924 comprising parallel rotary brush rolls cooperating with an endless brush conveyor device, which travels longitudinally therebetween, to form runways for supporting fruit.

Referring to the drawing, 10 and 11 indicate two cylindrical brush rolls of a rubbing or brushing unit of the type just referred to. These brush rolls are spaced apart as shown and are suitably journaled at their ends in a supporting framework (not shown) for rotation about their longitudinal axes, the rolls being suitably driven in opposite directions by any suitable means, not shown. Disposed in the space between the brush rolls 10 and 11 is an endless brush and conveyor mechanism adapted, during its upper run or pass, to travel longitudinally of and between the brush rolls 10 and 11 and to cooperate therewith in properly rubbing the fruit while at the same time advancing it toward the delivery end of the unit. This endless brush and conveyor mechanism comprises an endless chain 12 running over two sprockets, (not shown), one at each end of the unit, said chain carrying brush blocks indicated generally at 13, which blocks are individually secured to the conveyor chain in any suitable manner. As shown in Fig. 1, said blocks 13 are of generally triangular or inverted V-shaped cross section and each is secured to the conveyor chain 12 on one side or base, the other two sides or inclined lateral faces being provided with a surfacing of brush bristles as indicated at 14. In its upper run, the endless chain brush mechanism slides upon a stationary supporting strip or board 15 which is centrally grooved to receive and guide the conveyor chain 12 to which the brush blocks 13 are secured, each of said brush blocks being similarly grooved or recessed on the side fastened to said chain, as shown. It is apparent that the upper run of the endless brush and conveyor mechanism cooperates with the aforesaid cylindrical brush rolls 10 and 11 to provide two trough-shaped runways for fruit, such fruit being indicated by F. The arrangement of the parts is such that fruit cannot fall down through the machine, but is supported in the proper position by the cooperating brush surfaces, as illustrated. The endless brush block mechanism is driven in such manner that the upper pass travels toward the discharge end of the machine as indicated by the arrow in Fig. 2. In order to advance the fruit positively toward the discharge end of the machine, the endless brush block mechanism is provided at suitable intervals with pushers 16, each of which may be secured to one end of a brush block 13 in the space between it and the next block in the series, said pusher projecting into the fruit runways from the opposite inclined faces of the block. These pushers are adapted to engage the fruit as the brush block mechanism advances, thus positively feeding the fruit through the machine.

The fruit to be rubbed or brushed is fed by any suitable means to the runways formed by the cylindrical brush rolls and the brush blocks, where it is subjected to the rubbing action of one of the rotary cylindrical brush rolls on the one hand and of the rectilinearly advancing brush blocks 13 on the other. If desired, the brushing apparatus may be provided with any suitable means for applying a washing or treating liquid or solution and/or a liquid protective material to the fruit as it passes along said runways.

The rotating brush rolls tend to spin or rotate the fruit, principally on a single axis, so that if the axes upon which this spinning takes place are not constantly changed, all portions of the surface of the fruit will not be thoroughly brushed. Accordingly, means have been provided for causing the fruit to turn irregularly on frequently changing axes as it goes through the machine. In the example illustrated, these means comprise pivoted fruit-retarding members or "turn-over" devices, indicated generally by 17, arranged at intervals to project upwardly into the path of the fruit as it passes along in the runways, these projections or devices serving to retard or arrest the fruit temporarily and compel a change in the axis of rotation. These fruit-retarding devices each comprise a rod or arm 18 secured intermediate its ends to one end of a stub shaft or pivot pin 19 rotatably mounted in the bearing or journal box 20 provided with a flanged portion 21 secured by screws or the like to the edge or side of chain-supporting strip or board 15. As shown in Fig. 1, board 15 is provided with a recess or socket 22 leading in from the edge to receive the body portion of bearing 20. As shown in Fig. 3, arm 18 passes through a hole 23 provided in one end of shaft 19 and is held in place by a pin 24, this arrangement cooperating with a pin 25 in the other end of shaft 19 to hold said shaft in bearing 20. As shown in Figs. 1 and 2, one end of the arm or rod 18 is provided with one or more weights 26 removably held in place by a nut or similar fastening means 27, the effect of this being to yieldingly hold the arm 18 in a substantially vertical position so that it projects upwardly into the path of travel of the fruit in each of the runways, the curved end 28 engaging the lower or bottom portions of the fruit to arrest or retard its movement sufficiently to compel a change in its axis of rotation. The retarding devices are so adjusted that they will yield to comparatively light pressure and thus avoid injury to the fruit and obviate pushing of the fruit out of the runways; and the upper ends 28 of the arms 18 are curved in the direction of travel of the fruit and provided with a smooth flat surface to cooperate in avoiding such injury. As shown in Fig. 1, the retarding devices are so mounted, in the spaces between the brush rolls and the brush block conveyor, that ordinarily they do not come into contact with the pusher members 16, but even if such contact should take place, no harm will be done as the retarding devices will readily yield to allow the pusher members to pass.

From the foregoing it will be observed that the fruit-retarding device embodying this invention is simple in construction and readily installed and that, being made entirely of metal, without any springs or other parts which might get out of adjustment, it will operate for long periods of time without requiring repair or adjustment.

It is to be understood that the invention is not limited to the exact arrangements shown and described and that various modifications can be made without departing from the spirit and scope of the invention as defined in the claims.

What is claimed is:

1. Apparatus for treating fruit comprising the combination, with rubbing means providing a runway for fruit, of a pivoted fruit-retarding device provided with a depending weighted portion adapted to cause said device to normally project upwardly into the path of travel of fruit in said runway and to engage the lower portions of said fruit.

2. Apparatus for treating fruit comprising the combination, with rubbing means providing a runway for fruit, of a device arranged to retard movement of fruit in said runway, said device comprising a pivoted arm having one end curved and the other end weighted so as to yieldingly hold the curved end in the path of the fruit, said other end engaging the lower portions of said fruit.

3. Apparatus for treating fruit comprising the combination, with rubbing means providing a runway for fruit, of a fruit-retarding device, said device comprising a journal-box, a shaft mounted therein, and an arm secured to said shaft, one end of said arm being weighted so as to yieldingly hold the other end in the path of fruit in said runway, said other end engaging the lower portions of said fruit.

ERNEST M. BROGDEN.